US006387291B2

(12) United States Patent
Lesko et al.

(10) Patent No.: US 6,387,291 B2
(45) Date of Patent: May 14, 2002

(54) LEATHER COATING BINDER AND COATED LEATHER HAVING GOOD EMBOSSABILITY AND WET-FLEX ENDURANCE

(75) Inventors: Patricia Marie Lesko, Ottsville; Frederick James Schindler, Ft. Washington, both of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/870,576

(22) Filed: May 31, 2001

Related U.S. Application Data

(62) Division of application No. 09/480,204, filed on Jan. 10, 2000, now Pat. No. 6,290,866.
(60) Provisional application No. 60/116,979, filed on Jan. 25, 1999.

(51) Int. Cl.$^7$ .................. C14C 11/00; C09D 133/00
(52) U.S. Cl. ............... 252/8.57; 427/389; 525/360; 525/370; 525/371; 525/372; 525/373
(58) Field of Search ............... 252/8.57; 427/389; 525/360, 370, 371, 372, 373

(56) References Cited

U.S. PATENT DOCUMENTS

| 3,345,336 A | 10/1967 | Kuhlkamp et al. ...... 525/328.6 |
| 5,202,375 A | 4/1993 | Biale ...................... 524/562 |
| 5,723,182 A | 3/1998 | Choi et al. ................. 427/389 |

FOREIGN PATENT DOCUMENTS

| AU | 49252/72 | 11/1972 |
| EP | 199087 | 10/1986 |
| EP | 789063 | * 8/1997 |

* cited by examiner

*Primary Examiner*—Anthony Green
(74) *Attorney, Agent, or Firm*—Ronald D. Bakule

(57) ABSTRACT

An aqueous leather coating composition and a method for coating leather with the aqueous coating composition are provided. The aqueous coating composition contains an aqueous emulsion polymer which includes from 0.4% to 10% by weight of a copolymerized acetoacetate or acetoacetamide monomer and has a glass transition temperature from −20° C. to 10° C. In an alternative embodiment the aqueous coating composition contains an aqueous emulsion polymer which includes from 0.1% to 6% by weight of a copolymerized acetoacetate or acetoacetamide monomer and from 2% to 15% by weight of copolymerized carboxylic acid monomer and has a glass transition temperature from −40° C. to 0° C., the polymer having been contacted with a transition metal oxide, hydroxide, or carbonate at a pH less than 9 in an amount greater than 0.20 equivalent of transition metal per equivalent of copolymerized carboxylic acid monomer.

4 Claims, No Drawings

LEATHER COATING BINDER AND COATED LEATHER HAVING GOOD EMBOSSABILITY AND WET-FLEX ENDURANCE

This is a Divisional application of prior application Ser. No. 09/480,204, filed on Jan. 10, 2000, now U.S. Pat. No. 6,290,866, which claims benefit of Provisional No. 60/116,979 filed Jan. 25, 1999.

This invention relates to an aqueous composition suitable for use in coating leather and a method for coating leather with an aqueous coating composition to provide coated leather having good embossability and wet-flex endurance. More particularly this invention relates to an aqueous composition including an emulsion polymer including from 0.4% to 10% by weight of copolymerized acetoacetate or acetoacetamide monomer based on the weight of the polymer and having a glass transition temperature (Tg) from −20° C. to 10° C. More particularly, in a second embodiment, this invention relates to an aqueous composition including an emulsion polymer including from 0.1% to 6% by weight of copolymerized acetoacetate or acetoacetamide monomer based on the weight of the polymer and from 2% to 15% by weight of copolymerized carboxylic acid monomer based on the weight of the polymer and having a glass transition temperature (Tg) from −20° C. to 10° C., the polymer having been contacted with a transition metal oxide, hydroxide, or carbonate at a pH of less than 9 in an amount greater than 0.20 equivalent of transition metal per equivalent of the copolymerized carboxylic acid monomer in the polymer.

The present invention serves to provide an aqueous composition suitable for use in coating leather, particularly a basecoating, that is aesthetically pleasing and protective and a method for coating leather. The protective properties of the leather coating may be measured by the flexing endurance of the coated leather, particularly under wet conditions. The coating may be subsequently embossed for decorative purposes with a desired imprint in a heated press. The softness of the final coated leather, the ability of the coating to be embossed easily without clinging to the heated press and the retention of the desired imprint are measured aesthetic properties of the coated leather.

U.S. Pat. No. 5,202,375 discloses a water-resistant polymeric emulsion and coatings containing the emulsion applied to particle board and plywood. The polymeric emulsion polymer contains from about 1 to about 5 weight percent olefinic carboxylic acid monomer and from about 0.5 to about 5 weight percent crosslinking monomer such as, for example, acetoacetoxyethyl methacrylate; and has a Tg of about −50° C. to about 50° C., preferably from about 0° C. to about 20° C.

The problem faced by the inventors is the provision of an aqueous composition suitable for use in coating leather that is aesthetically pleasing and protective and a method for coating leather which yields a dried coating on leather that has good embossability and wet-flex resistance.

In a first aspect of the present invention there is provided an aqueous composition suitable for use in coating leather including an emulsion polymer including from 0.4% to 10% by weight of copolymerized acetoacetate or acetoacetamide monomer based on the weight of the polymer and having a glass transition temperature (Tg) from −20° C. to 10° C.

In a second aspect of the present invention there is provided an aqueous composition suitable for use in coating leather including an aqueous emulsion polymer including from 0.1% to 6% by weight of copolymerized acetoacetate or acetoacetamide monomer based on the weight of the polymer and from 2% to 15% by weight of copolymerized carboxylic acid monomer based on the weight of the polymer and having a glass transition temperature (Tg) from −40° C. to 0° C.; the polymer having been contacted with a transition metal oxide, hydroxide, or carbonate at a pH of less than 9 in an amount greater than 0.20 equivalent of transition metal per equivalent of copolymerized carboxylic acid monomer in the polymer.

In a third aspect of the present invention there is provided a method for coating leather including (a) forming an aqueous composition including an emulsion polymer including from 0.4% to 10% by weight of copolymerized acetoacetate or acetoacetamide monomer based on the weight of the polymer and having a glass transition temperature (Tg) from −20° C. to 10° C.; (b) coating leather with the aqueous composition; and (c) drying, or allowing to dry, the aqueous composition.

In a fourth aspect of the invention there is provided a method for coating leather including (a) forming an aqueous composition including an emulsion polymer including from 0.1% to 6% by weight of copolymerized acetoacetate or acetoacetamide monomer based on the weight of the polymer and from 2% to 15% by weight of copolymerized carboxylic acid monomer based on the weight of the polymer and having a glass transition temperature (Tg) from −40° C. to 0° C.; (b) contacting the polymer with a transition metal oxide, hydroxide, or carbonate at a pH of less than 9 in an amount greater than 0.20 equivalent of transition metal per equivalent of the copolymerized carboxylic acid monomer in the polymer; (c) coating leather with the aqueous composition; and (d) drying, or allowing to dry, the aqueous composition.

This invention relates to a composition suitable for use in coating leather and a method for coating leather with an aqueous composition including an emulsion polymer including at least one copolymerized ethylenically unsaturated monomer and from 0.4% to 10% by weight, preferably from 0.4% to 4% by weight, of copolymerized acetoacetate or acetoacetamide monomer and has a glass transition temperature (Tg) from −20° C. to 10° C. The emulsion polymer contains at least one copolymerized ethylenically unsaturated monomer exclusive of copolymerized acetoacetate or acetoacetamide monomer such as, for example, a (meth)acrylic ester monomer including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, aminoalkyl (meth)acrylates; styrene or substituted styrenes; butadiene; vinyl acetate or other vinyl esters; vinyl monomers such as vinyl chloride, vinylidene chloride, N-vinyl pyrollidone; and acrylonitrile or methacrylonitrile. The use of the term "(meth)" followed by another term such as acrylate or acrylamide, as used throughout the disclosure, refers to both acrylates or acrylamides and methacrylates and methacrylamides, respectively. Preferred is the absence of copolymerized monomers containing functional group(s) capable of chemical reaction with acetoacetate or acetamide groups such as, for example aldehyde and amine groups. Preferred is a polymer including 25–65% by weight of copolymerized ethyl acrylate.

The emulsion polymer contains from 0.4% to 10% by weight of copolymerized acetoacetate or acetoacetamide monomer, i.e., an ethylenically unsaturated monomer containing an acetoacetate or acetoacetamide grouping, such as, for example, vinyl acetoacetate, acetoacetoxyethyl (meth)acrylate, acetoacetoxypropyl (meth)acrylate, allyl acetoacetate, acetoacetoxybutyl (meth)acrylate, 2,3-di(acetocacetoxy)propyl (meth)acrylate, vinyl acetoacetamide, and acetoacetoxyethyl (meth)acrylamide.

The emulsion polymer may also contain from 0% to 10% of a copolymerized monoethylenically-unsaturated carboxylic acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, and maleic anhydride. Preferred carboxylic acid monomers are acrylic acid, methacrylic acid, and itaconic acid.

The emulsion polymer used in this invention may also contain from 0% to 5% copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

The glass transition temperature ("Tg") of the emulsion polymer is from $-20°$ C. to $10°$ C., as measured by differential scanning calorimetry (DSC) taking the mid-point in the heat flow versus temperature transition as the Tg value.

The polymerization techniques used to prepare aqueous emulsion-polymers are well known in the art. In the emulsion polymerization process conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of monomer. Either thermal or redox initiation processes may be used. The monomer mixture may be added neat or as an emulsion in water. The monomer mixture may be added in one or more additions or continuously over the reaction period allotted. Addition the monomer in a single portion at the beginning of the reaction is preferred. Conventional free radical initiators may be used such as, for example, hydrogen peroxide, t-butyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, and sodium bisulfite may be used at similar levels. Chain transfer agents such as mercaptans may be used to lower the molecular weight of the formed polymer of one or more of the stage polymers; the use of no chain transfer agent is preferred.

The average particle diameter of the emulsion-polymerized polymer particles is preferred to be from 30 nanometers to 500 nanometers.

In an alternative embodiment the emulsion polymer may be prepared in a multistage polymerization process in which two or more polymeric stages varying in composition are prepared in sequential fashion. The polymerization techniques used to prepare such aqueous multi-stage emulsion-polymers are well known in the art such as, for example, U.S. Pat. Nos. 4,325,856; 4,654,397; and 4,814,373. A preferred two-stage polymer has at least 80% by weight based on the weight of the polymer of a first polymer containing from 0.1% to 10% by weight of copolymerized acetoacetate or acetoacetamide monomer and having a Tg from $-40°$ C. to $0°$ C., and 2% to 20% by weight based on the weight of the polymer of a second polymer containing from 0% to 10% by weight of copolymerized acetoacetate or acetoacetamide monomer and having a Tg at least $10°$ C. higher than the Tg of the first polymer. Such a process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the appearance of the phases, for example, is such a technique.

This invention also relates to an aqueous composition suitable for use in coating leather of the second aspect of the invention including an aqueous emulsion polymer including from 0.1% to 6% by weight, preferably from 0.1% to 4%, more preferably from 0.4% to 1% by weight, of copolymerized acetoacetate or acetoacetamide monomer based on the weight of the polymer, and from 2% to 15% by weight, preferably from 4% to 5% by weight, of copolymerized carboxylic acid monomer based on the weight of the polymer and having a glass transition temperature (Tg) from $-40°$ C. to $0°$ C., preferably from $-40°$ C. to $-8°$ C.; the polymer having been contacted with a transition metal oxide, hydroxide, or carbonate at a pH of less than 9 in an amount greater than 0.20 equivalent, preferably greater than 0.50 equivalent, of transition metal per equivalent of copolymerized carboxylic acid monomer in the polymer. The components, but not necessarily the quantities, ranges, or values of the elements, of the aqueous emulsion polymer of this second aspect such as the copolymerized monomer, the copolymerized acetoacetate or acetamide monomer, the copolymerized carboxylic acid, and the Tg are the same as defined hereinabove for the first aspect, as is the method of preparation and adjuvants used therein.

The emulsion polymer of the second aspect is contacted with a transition metal oxide, hydroxide, or carbonate at pH less than pH=9, preferably at pH =3–6, in an amount greater than 0.20 equivalent, preferably greater than 0.50 equivalent, of transition metal per equivalent of copolymerized carboxylic acid monomer in the emulsion polymer according to the process disclosed in U.S. Pat. No. 5,221,284. The oxides, hydroxides, and carbonates of zinc, aluminum, tin, tungsten, and zirconium are preferred for low cost, low toxicity, and low color in the dried coating. Zinc oxide is more preferred. The transition metal oxide, hydroxide, or carbonate may be added slurried in water, optionally with an added dispersant such as, for example a low molecular weight polymer or copolymer of (meth)acrylic acid. The transition metal oxide, hydroxide, or carbonate may be added during the polymerization process or after the polymerization has been completed. Alternatively, the transition metal may be added in a soluble form such as a solution of zinc ammonium carbonate added after the formation of the emulsion polymer and neutralization of the emulsion polymer to a pH greater than 8.

The aqueous composition is prepared by techniques which are well known in the coatings art. First, optionally, at least one pigment is well dispersed in an aqueous medium under high shear such as is afforded by a COWLES (R) mixer or, in the alternative, at least one predispersed colorant is used. Then the emulsion polymer is added under low shear stirring along with other coatings adjuvants as desired. The aqueous coating composition may contain, in addition to the optional pigment(s) and the emulsion polymer, conventional coatings adjuvants such as, for example, emulsifiers, coalescing agents, buffers, neutralizers, thickeners, humectants, wetting agents, biocides, plasticizers, antifoaming agents, colorants, waxes, and anti-oxidants. Preferred is an aqueous composition free from organic compounds or polymers containing functional group(s) capable of chemical reaction with acetoacetate or acetamide groups such as, for example aldehydes and amines.

The solids content of the aqueous coating composition may be from about 10% to about 50% by volume. The viscosity of the aqueous composition may be from 0.05 to 10 Pa.s (50 cps to 10,000 cps), as measured using a Brookfield viscometer; the viscosities appropriate for different application methods vary considerably.

The aqueous coating composition may be applied to leather such as, for example, mineral tanned or vegetable tanned leather including full-grain leather, buffed or corrected-grain leather, and split leather with or without a prior treatment with an impregnating resin mixture and with or without the application of subsequent coatings using conventional coatings application methods such as, for example, curtain coater and spraying methods such as, for example, air-atomized spray, air-assisted spray, airless spray, high volume low pressure spray, and air-assisted airless spray.

The aqueous coating composition coated on leather is typically dried, or allowed to dry, at a temperature from 20° C. to 75° C.

Experimental Methods

Flexing Endurance of Coated Leather

The flexing endurance under wet or dry conditions is based on the IUF 20 method of International Union of Leather Chemists Association using a Bally Flexometer (Bally SchuhFabriken AG, Schoenenwerd, Switzerland). The dry or wet leather specimens (65 mm. by 40 mm.) were flexed and examined for the extent of cracking after the reported number of flexes.

Embossing Tests

The coated leather was embossed in a Turner-type press at 85–95° C. and 70.3 kg/cm$^2$ (1000 psi) for 5–7 seconds and the ease of removability from the hot embossing press ("plate cling") was evaluated using a haircell plate. The print quality was evaluated by examining the embossed haircell pattern for distinctness and sharpness. Cutting, which is the ability to receive deep prints without tearing of the coating, was evaluated by examining the embossed pattern made using a Llama plate for cuts in the film with a 10-power microscope.

Abbreviations

EA=ethyl acrylate

BA=butyl acrylate

AN=acrylonitrile

AA=acrylic acid

EHA=2-ethylhexyl acrylate

AAEM=2-acetoacetylethyl methacrylate

BMA=butyl methacrylate

ACRYSOL and HYDROLAC are trademarks of Rohm and Haas Company. EUDERM, BAYDERM, and EUKANOL are trademarks of Bayer AG.

The following examples are presented to illustrate the invention and the results obtained by the test procedures.

EXAMPLE 1

Preparation of an Emulsion Polymer

Preparation of Sample 1. The polymerization was carried out in a 3 liter, four-neck, round bottom glass flask equipped with a mechanical blade stirrer, a thermocouple to monitor the temperature, a reflux condenser, a means to heat and cool, and a nitrogen atmosphere. The flask was charged with 420 g of deionized water and 1.0 g of sodium lauryl sulfate and heated to 55° C. A monomer pre-emulsion was prepared from 410 g deionized water, 9 g sodium lauryl sulfate, 890 g ethyl acrylate, 100 g 2-(acetoacetoxy)ethyl methacrylate and 10 g of acrylic acid. 70 g of the monomer pre-emulsion was added to the reaction flask together with 0.02 g of iron (II) sulfate heptahydrate, 4.8 g of ammonium persulfate and 0.1 g of sodium bisulfite. A total of 50 g of deionized water was used to dissolve the iron sulfate, ammonium persulfate and sodium bisulfite and to rinse the materials into the reaction flask. Following a 10° C. exotherm, the remaining monomer pre-emulsion, with an additional 0.5 g ammonium persulfate and 0.9 g sodium bisulfite were added to the reaction flask over a 3 hour period while the temperature was maintained at 60° C. A total of 93 g of deionized water was used to dissolve the ammonium persulfate and sodium bisulfite and to rinse the containers for these reagents and the pre-emulsion to the reaction flask. Following this, 3.5 g of 70% tert-butyl hydroperoxide, 1.7 g isoascorbic acid and 0.02 g iron sulfate heptahydrate were added to the reaction with a total of 90 g of deionized water. After cooling to 45° C., the pH was raised with 30 g of 28% aqueous ammonia. The reaction product was cooled to room temperature and filtered to remove coagulum. A polymer latex with a solids content of 46.9% by weight, a pH of 8.4 and a viscosity of 0.04 Pa.s (40 cps) was obtained. The polymer Tg was determined to be −10° C.

Samples 2–5 and Comparative Samples A–F were prepared according to the process for Sample 1 with quantities of monomers corresponding to the compositions presented in Table 1.1

TABLE 1.1

Compositions of Sample 2 and Comparative Samples A–B

| Sample | Composition | Tg (in ° C.) |
|---|---|---|
| Comp. A | 90 EA/9 MMA/1 AA | −7 |
| 2 | 80 BA/8 AN/10 AAEM/2 AA | −19 |
| Comp. B | 81 BA/8 AN/9 MMA/2 AA | −17 |

EXAMPLE 2

Preparation of Emulsion Polymer

Preparation of Sample 3. The polymerization was carried out in a 5 liter, four-neck round bottom glass flask equipped with a mechanical blade stirrer, a thermocouple to monitor the temperature, a reflux condenser, a means to heat and cool, and a nitrogen atmosphere. The flask was charged at room temperature with 1765 g deionized water, 20 g sodium lauryl sulfate, 960 g ethyl acrylate, 10 g 2-(acetoacetoxy) ethyl methacrylate and 30 g acrylic acid. Polymerization was initiated with 0.02 g iron sulfate heptahydrate in 5 g deionized water, 0.25 g ammonium persulfate in 10 g deionized water and 1.1 g technical grade sodium hydrosulfite in 20 g deionized water. A rapid exotherm to 90° C. was observed. After cooling to 60° C., 2.5 t of 70% tert-butyl hydroperoxide and 1.3 g of isoascorbic acid in a total of 60 g of deionized water were added to the reaction flask. After cooling to 40° C. a slurry of 5 g zinc oxide in 14.5 g deionized water was added to the reaction flask and stirred for one hour. The pH was then raised with 19 g of 18% aqueous ammonia. The reaction product was cooled to room temperature and filtered to remove coagulum. A polymer latex with a solids content of 34.8% by weight, a pH of 7.7 and a viscosity of 0.048 Pa.s (48 cps) was obtained.

Samples 4–26 and Comparative Samples C–G were prepared according to the process for Sample 4 with quantities of monomers corresponding to the compositions presented in Table 2.1

TABLE 2.1

Compositions of Samples 4–26 and Comparative Samples C–G

| Sample | Composition | Polymer Tg (in °C.) |
|---|---|---|
| Comp. C | 90 EA/9 MMA/1 AA | −6 |
| Comp. D | 96.5 EA/3.5 AA//0.25 eqv. ZnO | −9 |
| 4 | 93.5 EA/3 AAEM/3.5 AA//0.25 eqv. ZnO | −7.5 |
| Comp. E | 87.5 EA/9 AAEM/3.5 AA//0.25 eqv. ZnO | −5 |
| 5 | 95.5 EA/1 AAEM/3.5 AA//0.25 eqv. ZnO | −8 |
| 6 | 96.5 EA/1 AAEM/3.0 AA//0.29 eqv. ZnO | −9 |
| 7 | 96.5 EA/1 AAEM/2.5 AA//0.35 eqv. ZnO | −9 |
| 8 | 79.5 EA/15 BA/2 AAEM/3.5 AA//0.25 eqv. ZnO | −14 |
| 9 | 60.5 EA/35 BA/1 AAEM/3.5 AA//0.25 eqv. ZnO | −20 |
| 10 | 95.5 EA/1 AAEM/3.5 AA//0.25 eqv. ZnO | −9 |
| 11 | 61 EA/35 BA/0.5 AAEM/3.5 AA//0.75 eqv. ZnO | −24 |
| 12 | 41 EA/55 BA/0.5 AAEM/3.5 AA//0.75 eqv. ZnO | −30 |
| 13 | 21 EA/75 BA/0.5 AAEM/3.5 AA//0.75 eqv. ZnO | −37 |
| 14 | 61 EA/35 EHA/0.5 AAEM/3.5 AA//0.75 eqv. ZnO | −29 |
| 15 | 51 EA/45 EHA/0.5 AAEM/3.5 AA//0.75 eqv. ZnO | −36 |
| 16 | 60.6 EA/35BA/0.9 AAEM/3.5 AA//0.9 eqv. ZnO | −23 |
| 17 | 80.6 BA/15 MMA/0.9 AAEM/3.5 AA//0.9 eqv. ZnO | −24 |
| 18 | 63.6 BA/32 BMA/0.9 AAEM/3.5 AA//0.9 eqv. ZnO | −25 |
| 19 | 43.6 BA/52 BMA/0.9 AAEM/3.5 AA//0.9 eqv. ZnO | −12 |
| 20 | 68.6 BA/27 MMA/0.9 AAEM/3.5 AA//0.9 eqv. ZnO | −12 |
| 21 | 56.6 BA/39 BMA/0.9 AAEM/3.5 AA//0.9 eqv. ZnO | −20 |
| Comp. F | 23.6 BA/72 BMA/0.9 AAEM/3.5 AA//0.9 eqv. ZnO | +8 |
| Comp. G | 56.6 BA/39 MMA/0.9 AAEM/3.5 AA//0.9 eqv. ZnO | +14 |
| 22 | 59.6 EA/35 BA/0.9 AAEM/4.5 AA//0.7 eqv. ZnO | −20 |
| 23 | 57.3 BA/29.8 EA/0.9 AAEM/4.5 AA//0.7 eqv. ZnO | −22 |
| 24 | 57.3 BA/28.8 EA/0.9 AAEM/5.5 AA//0.57 eqv. ZnO | −21 |
| 25 | 89 EA/10 AAEM/1 AA | −8 |
| 26 | 90.5 EA/6 AAEM/3.5 AA//0.25 eqv. ZnO | −5 |

EXAMPLE 3

Evaluation of Embossing Properties of Leather Coated with Aqueous Compositions

An aqueous composition was prepared with 60 g predispersed black pigment (Stahl PP-15979) and 42 g polymer solids diluted to a total of 123 g with water, 7.5 g of 1/1 Acrysol RM-2020/water. It was sprayed in two coats, 0.015 and 0.0065 g/sq cm(14 and 6 grams/sq.ft), on upholstery weight corrected grain leather and dried for 2 minutes at 93.3° C. (200° F). Pieces of coated leather were cut 3.8 cm by 11.4 cm (1.5 in by 4.5 in) and embossed together with plates having either a coarse hair cell (CHC) or Llama print. Plate cling was evaluated using the CHC plate, resistance to cutting was evaluated using the Llama plate. Results are presented in Tables 3.1 and 3.2

TABLE 3.1

Plate Cling with Coarse Hair Cell Plate at Plate Temperatures of 87° C. and 82° C.

| Polymer Sample | Plate Cling Rating (87° C./82° C.) |
|---|---|
| 1 | Slight-Moderate/Slight-Moderate |
| Comp. A | Moderate-Severe/Severe (damage) |
| 2 | Slight-Moderate/Slight-Moderate |
| Comp. B | Severe (damage)/Severe (damage) |

TABLE 3.1-continued

Plate Cling with Coarse Hair Cell Plate at Plate Temperatures of 87° C. and 82° C.

| Polymer Sample | Plate Cling Rating (87° C./82° C.) |
|---|---|
| Comp. C | Slight-Moderate/Moderate |
| 25 | Slight-Moderate/Slight-Moderate |

Leather coated with compositions of the invention containing Samples 1 and 2 exhibit performance superior to leather coated with compositions Comp. A and Comp. B, respectively.

TABLE 3.2

Cutting with Llama Plate at Plate Temperatures of 88° C. and 100° C.

| Polymer Sample | Cut Rating (88° C./100° C.) |
|---|---|
| 1 | OK(−)/OK |
| Comp. A | Severe/Severe |
| 2 | OK(−)/OK |
| Comp. B | Severe/Severe |
| Comp. C | Moderate-Severe/Moderate-Severe |
| 25 | OK(−)/OK |

Leather coated with compositions of the invention containing Samples 1, 2, and 25 exhibit performance substantially superior to leather coated with compositions Comp. A, Comp. B, and Comp. C, respectively.

EXAMPLE 4

Evaluation of Wet-Flex Endurance of Leather Coated with Aqueous Compositions

Aqueous compositions were prepared with 40 g predispersed white pigment (Stahl P-4805) and 21 g polymer solids made up to 60 g with water. Full grain leather was coated with two coats, 0.015 and 0.0086 g/sq cm (14 and 8 g/sq ft), and dried for 2 minutes at 93.3° C. (200° F.). The coated leather was embossed with a coarse hair cell plate at 70–75° C., 50 tons for 8 seconds and topcoated with 0.0043 g/sq cm (4 g/sq ft) 2/1 Hydrolac R/water.

The wet flex endurance test was conducted two days after spraying. Results are presented in Table 4.1

TABLE 4.1

Wet Bally Flex Endurance Test Results

| Polymer Sample | Cracks to Leather after 34,000 cycles |
|---|---|
| 1 | None |
| Comp. A | Severe |
| 2 | None |
| Comp. B | Severe |
| 25 | None |
| Comp. C | Severe |

Leather coated with compositions of the invention containing Samples 1, 2, and 25 exhibit performance substantially superior to leather coated with compositions Comp. A and Comp. B, and Comp. C, respectively.

EXAMPLE 5

Evaluation of Performance of Leather Coated with Aqueous Compositions Containing Emulsion Polymers having Various Levels of Copolymerized Acetoacetate Monomer An aqueous composition was prepared with 40 g predispersed white pigment (Stahl P-4805), 15.3 g polymer solids made up to a total of 65 g with water. Two coats of the composition were sprayed on full grain leather, 0.015 and 0.0065 g/sq cm (14 and 6 g/sq ft), dried for 2 minutes at 93.3° C. (200° F.). The coated leather was embossed and topcoated with )0.0043 g/sq cm (4 g/sq ft) 2/1 Hydrolac R/water. Evaluation results are presented in Tables 5.1 and 5.2.

TABLE 5.1

Evaluation of Embossing with Coarse Hair Cell (Cling & Definition) and Lhama (Cut Resistance) Plates

| Polymer Sample | Coarse Hair Cell Plate | | Llama Plate |
|---|---|---|---|
| | Plate Cling | Definition of Pits | Cutting |
| Comp. D | Moderate | Good | Severe |
| 4 | Moderate | Good | Slight |
| 26 | Slight | Good | Very Slight |
| Comp. E | Slight | Fair | Very Slight |

Leather coated with aqueous compositions containing emulsion polymer Samples 4 and 26 show that as the AAEM level increased, plate cling and, particularly, cut resistance improved; however, plate definition decreased at the highest level of AAEM (Comp. E).

TABLE 5.2

Wet Bally Flex Endurance Test Results Test 2 days After Spraying

| Polymer Sample | Cracks to Leather after 100,000 cycles |
|---|---|
| Comp. D | Severe (Blistered during soak) |
| 4 | None |
| 26 | None |
| Comp. E | None |

Even the lowest level of AAEM in the emulsion polymer (Sample 4) improved wet-flex endurance of the leather coated with an aqueous composition containing the emulsion polymer.

EXAMPLE 6

Evaluation of Performance of Leather Coated with Aqueous Compositions Containing Emulsion Polymers having Various Compositions An aqueous coating composition was prepared with 50 g predispersed white pigment (Euderm D CR), 12.5 g silicon dioxide dulling agent (Euderm Duller SN), 26.3 g polymer solids, 13.2 g 1/3 polyacrylate thickener (Euderm Additive NA)/water, and made up with water to 200 g total. Two coats, 0.015 and 0.0075 g/sq cm (14 and 7 g/sq ft), of the composition were sprayed on corrected grain leather and each was dried for 2 minutes at 93.3° C. (200° F.). The coated leather was embossed with a coarse hair cell plate, and topcoated with 0.0043 g/sq cm (4 g/sq ft) 2/1 Hydrolac R/water. Results are presented in Table 6.1.

TABLE 6.1

Dry Bally Flex Endurance Test Results - Tested One Day After Spraying

| Polymer Sample | Cracks to Leather after 96,000 cycles |
|---|---|
| 5 | Moderate-Severe |
| 6 | Slight-Moderate |
| 7 | Moderate-Severe |
| 8 | None |
| 9 | None |

EXAMPLE 7

Evaluation of Performance of Leather Coated with Aqueous Compositions Containing Emulsion Polymers having Various Compositions Aqueous coating compositions containing Samples 10–15 and Comparative Sample D were prepared with 50 g Euderm D-CR and 26.5 g polymer solids made up with water to 125 g (175 g total). The viscosity was adjusted to 0.07–0.09 Pa.s (70–90 cps) with 1/1 RHOPLEX RM-2020/water. Two coats of the composition were sprayed on full grain leather, 0.014 and 0.0097 g/sq cm (13 and 9 g/sq ft), and each was dried for 2 minutes at 93.3° C. (200° F.). The coated leather was embossed with a coarse hair cell press plate and topcoated with 0.0043 g/sq cm (4 g/sq ft) 2/1 Hydrolac R/water.

Wet Bally flex endurance was measured 3 days after spraying. Leather coated with the aqueous coating containing Comparative Sample D gave severe cracking, Samples 10–15 gave no cracking to leather after 100,000 cycles. Leather with coatings made from Samples 11–15 were tested for cold (−20° C.)

Bally flex; after 20,000 cycles the Sample 11 leather showed very slight cracking; with polymers 12–15 there was no cracking.

TABLE 7.1

Print Definition with Coarse Hair Cell Plate at 87° C.

| Polymer Sample | Quality of Print Definition |
|---|---|
| Comp. D | Excellent/slightly cut |
| 10 | Good |
| 11 | Good |
| 12 | Fair |
| 13 | Fair |
| 14 | Poor |
| 15 | Poor |

EXAMPLE 8

Evaluation of Performance of Leather Coated with Aqueous Compositions Containing Emulsion Polymers having Various Compositions Aqueous coating compositions were prepared with 10 g predispersed black pigment (Stahl Black PP-15979), 15 g water, 25 g Euderm Nappasoft S, 5 g Euderm Duller SN, and 57 g polymer at 35% solids. Coating viscosity was adjusted to 0.07–0.08 Pa.s (70–80 cps) with Euderm Paste M. Two coats, 0.014 and 0.0065 g/sq cm (13 g and 6 g/sqft), were sprayed on corrected grain leather. Each was dried for 2 minutes at 93.3° C. (200° F.). Coated leather was embossed—232 sq cm (0.25 sq ft) pieces for 5 seconds at temperatures shown and topcoated with 0.0043 g/sq cm (4 g/sq ft) 2/1 Hydrolac R/water. Test pieces were embossed with a coarse hair cell print for dry and wet Bally flex.

Wet Bally Flex was tested 3 days after spraying. Leather coated with coatings containing polymer Samples 16–19 and 21–22 and Comp. F passed 40,000 flexes without cracking to leather. Dry Bally Flex was tested 1 day after spraying. Leather coated with coatings containing all polymer Samples except Comp. G passed 100,000 flexes without cracking to leather.

TABLE 8.1

Embossing Properties

| Polymer Sample | Lhama Plate Cutting | Coarse Hair Cell Plate | |
|---|---|---|---|
| | | Plate Cling | Print Definition |
| 16 | Very Slight | Very Slight | Good |
| 17 | Moderate | Slight-Moderate | Fair |
| 18 | Moderate | Slight-Moderate | Fair |
| 19 | Moderate | Moderate | Fair |
| 20 | Moderate | Slight-Moderate | Fair-Good |
| 21 | Moderate | Slight-Moderate | Good-Very Good |
| Comp. F | Slight-Moderate | Moderate | Fair-Good |
| Comp. G | Slight-Moderate | Very Slight | Fair-Good |
| 22 | Very Slight | Very Slight | Fair-Good |

EXAMPLE 9

Evaluation of Performance of Leather Coated with Aqueous Compositions Containing Emulsion Polymers Having Various Compositions An aqueous coating composition was prepared from 140 g water/200 g Euderm D-CR white, 100 g Euderm Duller SN, 100 g aqueous emulsion of fatty acid esters (Euderm Nappasoft S), and 460 g polymer at 35% solids. Coating viscosity was adjusted to 0.06–0.07 (60–70 cps) with 1/1 Euderm Paste M/water. The composition was sprayed at 0.016 g/sq cm (15 g/sq ft) on corrected grain leather, ironed with a roll at 104.4° C. (220° F.), and two additional coats, 0.012 g/sq cm each (11 g/sqft each) were spray applied; each coat was dried for 2 minutes at 93.3° C. (200° F.). On the day after spraying, 7.0 cm by 15.2 cm (2.75 in by 6 in) pieces in pairs were embossed with a Llama plate at 92° C. for 5 seconds. 232 sq cm (0.25 sq.ft). pieces were embossed individually with a Coarse Hair Cell plate at 93° C. for 5 seconds.

TABLE 9.1

Glass Temperature and Embossing Properties

| Polymer Sample | Lhama Plate Cutting | Coarse Hair Cell Plate | |
|---|---|---|---|
| | | Plate Cling | Print Definition |
| 23 | Slight | Moderate | Fair-Poor |
| 24 | Slight-Moderate | Moderate | Fair-Poor |
| 22 | Slight-Moderate | Moderate-Severe | Good |
| 17 | Moderate | Moderate-Severe | Poor |

Leather coated with the aqueous composition containing the polymer without EA (Sample 17) exhibited poorer embossing than that of Samples 22–24.

What is claimed is:

1. An aqueous composition suitable for use in coating leather consisting essentially of
   (a) an aqueous emulsion polymer comprising from 0.4% to 10% by weight of copolymerized acetoacetate or acetoacetamide monomer based on the weight of said polymer and having a glass transition temperature (Tg) from −20° C. to 10° C.,
   (b) optionally, one or more thickeners,
   (c) optionally, one or more pigments,
   (d) optionally, one or more fatty acid esters,
   (e) optionally, one or more dulling agents, and
   (f) optionally, water in addition to that contained in (a), (b), (c), and (d).

2. A method for coating leather comprising
   (a) forming an aqueous composition consisting essentially of
      (i) an aqueous emulsion polymer comprising from 0.4% to 10% by weight of copolymerized acetoacetate or acetoacetamide monomer based on the weight of said polymer and having a glass transition temperature (Tg) from −20° C. to 10° C.,
      (ii) optionally, one or more thickeners,
      (iii) optionally, one or more pigments,
      (iv) optionally, one or more fatty acid esters,
      (v) optionally, one or more dulling agents, and
      (vi) optionally, water in addition to that contained in (i), (ii), (iii) and (iv),
   (b) coating leather with said aqueous composition; and
   (c) drying, or allowing to dry, said aqueous composition.

3. An aqueous composition suitable for use in coating leather consisting essentially of
   (a) an aqueous emulsion polymer comprising from 0.4% to 4% by weight of copolymerized acetoacetate or acetoacetamide monomer based on the weight of said polymer and having a glass transition temperature (Tg) from −20° C. to 10° C.,
   (b) optionally, one or more thickeners,
   (c) optionally, one or more pigments,
   (d) optionally, one or more fatty acid esters,
   (e) optionally, one or more dulling agents, and
   (f) optionally, water in addition to that contained in (a), (b), (c), and (d).

4. A method for coating leather comprising
   (a) forming an aqueous composition consisting essentially of
      (i) an aqueous emulsion polymer comprising from 0.4% to 4% by weight of copolymerized acetoacetate or acetoacetamide monomer based on the weight of said polymer and having a glass transition temperature (Tg) from −20° C. to 10° C.,
      (ii) optionally, one or more thickeners,
      (iii) optionally, one or more pigments,
      (iv) optionally, one or more fatty acid esters,
      (v) optionally, one or more dulling agents, and
      (vi) optionally, water in addition to that contained in (i), (ii), (iii) and (iv),
   (b) coating leather with said aqueous composition; and
   (c) drying, or allowing to dry, said aqueous composition.

* * * * *